Figure 1:
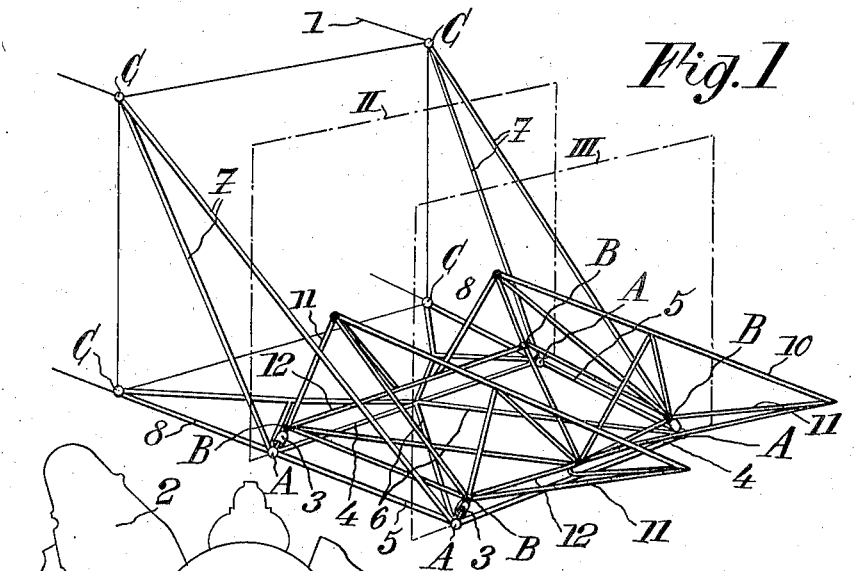

Feb. 14, 1939.  M. BIRKIGT  2,147,516

RESILIENT SUSPENSION FOR AIRCRAFT ENGINES

Filed Aug. 6, 1936

INVENTOR
MARC BIRKIGT

ATTORNEYS

Patented Feb. 14, 1939

2,147,516

UNITED STATES PATENT OFFICE 2,147,516

RESILIENT SUSPENSION FOR AIRCRAFT ENGINES

Marc Birkigt, Bois-Colombes, France

Application August 6, 1936, Serial No. 94,693
In Belgium April 27, 1936

4 Claims. (Cl. 248—5)

This invention relates to resilient means for suspending aircraft engines.

Its main purpose is to increase the mechanical strength of these suspension means, while maintaining the advantages of resilient suspension in respect of the absorption of vibration and the reduction of fatigue strains in the aircraft structure.

Prior to the introduction of resilient suspension of airplanes engines, it was common practice to support these engines in a cradle frame rigidly suspended in cantilever relation to the front end of the fuselage or nacelle of the airplane, said cradle being either provided with load-supporting members interconnected by transversal curved trusses passing around the engine crankcase, or equipped with lateral brackets independently suspended from the structural frame-work of the aircraft.

These designs were satisfactory, from the standpoint of strength and stiffness, only when the load-supporting members were rigidly bolted to the mounting brackets of the engine, for, under these circumstances, said engine acted as part of the structure and imparted the necessary stiffness to the latter.

However, this ceases to be the case as soon as elastic or resilient means of support are interposed between the engine and its cradle. From that moment, the engine proper not only ceases to act as a stiffening member to impart the necessary rigidity to its supporting cradle, but further becomes a source of dangerous stresses in said structure, owing to its own movements relative to the same.

The principal object of my invention is to correct this defect by providing a resilient suspension for aircraft engines in which the load-supporting and load-applying members between which are interposed the elastic and distortable cushioning members are so located that they can be securely braced by means of rigid and undistortable members subjected only to simple tensile or compressive stresses.

Another object of my invention is to provide a resilient suspension for aircraft engines comprising, on one hand, a cradle structure rigidly secured to the engine, and on the other hand, a cantilever structural frame rigidly secured to the engine supporting frame-work of the aircraft, while load-supporting members are incorporated in the cantilever frame and load-applying members in the cradle structure, and elastic and distortable cushioning means are inserted between said load-supporting and said load-applying members, said load-supporting members being moreover braced in pairs by means of rigid, and preferably rectilinear, structural parts subjected only to simple tensile or compressive stresses.

Further objects and advantages of my invention will appear to one skilled in the art from the following description, with reference to the accompanying drawing, it being understood, however, that said description and drawing are given mainly by way of example, and should not be construed as limiting the scope of the invention.

In this drawing:

Fig. 1 indicates diagrammatically a perspective view of a supporting structure for a V type aircraft engine, embodying my invention.

Figure 2:
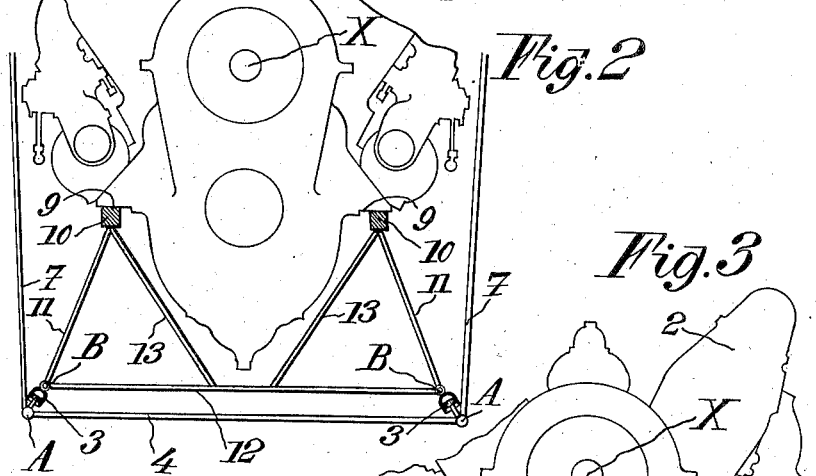
Figure 3:
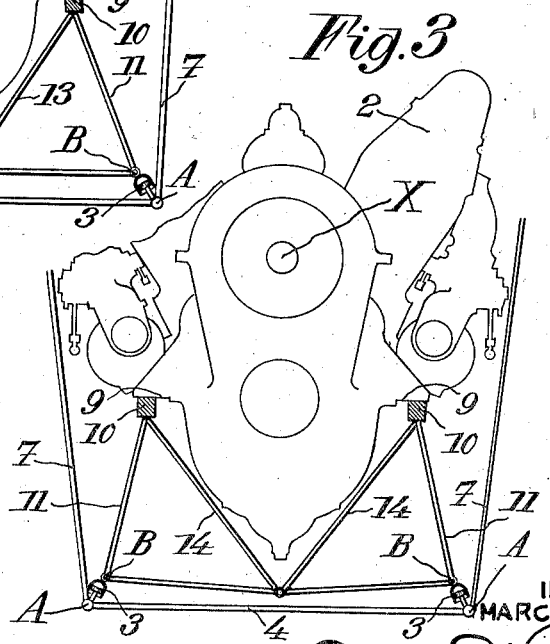

Figs. 2 and 3 indicate the same structure in transverse cross-section at planes II and III of Fig. 1.

In the embodiment of my invention illustrated diagrammatically in these figures, I build up both the cantilever engine supporting frame which is rigidly anchored to the fuselage of the plane, and the engine cradle which is rigidly secured to the engine, mainly of tension and compression members or struts, assembled in triangular formation, said struts being preferably made of tubing or of other suitable structural shapes having the required stiffness.

In the drawing, 1 indicates diagrammatically the front end of the fuselage of an airplane, and 2 the engine to be resiliently supported by said fuselage. To this end, I provide a cantilever frame anchored to the fuselage at points C, and an engine cradle secured to the mounting brackets 9 of said engine. In the figures, for greater clearness, the members of the cantilever frame have been indicated by double lines, and those of the engine cradle by solid black lines.

In the embodiment illustrated, the cantilever frame comprises four load-supporting members, for example, the joints at A, and the cradle comprises four load-applying members, for example the joints at B. But it is evident that any other number of load-supporting and applying members could be provided, although I prefer to have the same number of load-applying as of load-supporting members, and to so proportion the cantilever frame and the engine cradle that each load-applying member will be close to a corresponding load-supporting member.

I then interconnect each pair of load-applying and load supporting members by means of elastic connecting and cushioning devices 3, which leave the engine and its cradle a certain degree of freedom of motion, and so absorb the vibrations of the same. Said elastic cushioning devices may be of any suitable type, many of which are in common use at the present time. By way of example, I have indicated a type of elastic connector consisting of a cap member inclosing a heavy rubber disk, to the center of which is secured a stem member, the cap being secured to one of the parts which it is desired to interconnect resiliently, and the stem to the other part. However, any other suitable type of elastic mounting could be substituted therefor.

It is to be noted that the load-supporting members A are located on both sides of the vertical axial plane of the engine, preferably, but not necessarily, in pairs symmetrically spaced with respect to said vertical axial plane; and I interconnect said pairs of load-supporting members A, on either side of said vertical axial plane of the engine, by means of struts 4, preferably rectilinear, and subjected only to simple axial stresses such as tension or compression, for said struts may then be easily designed to offer the required resistance to forces tending to distort the structure. In order to make the cantilever frame rigid and to avoid its distortion, I further provide longitudinal struts, such as 5, interconnecting load-supporting members on the same side of the vertical axial plane of the engine, and cross-bracing such as 6; and I connect each load-supporting member A directly with the anchorage points C of the airplane fuselage, by means of tensile struts 7 and compressive members 8, and stiffen the structure by means of suitable cross-bracing members.

Insofar as concerns the load-applying members B, which may advantageously be joints in the cardle structure, said load-applying members are rigidly secured to the engine 2, preferably in such a manner as to locate them substantially in a plane beneath the engine proper. This might evidently be achieved by some form of bracket connecting said points with the mounting bracket 9 of the engine. However, I find it simpler and safer to provide, beneath said mounting brackets 9 of the engine, a cradle rigidly connected to the mounting brackets 9 and forming with said engine a thoroughly rigid structure, on which are located the load-applying members B, said members B forming a rigid quadrilateral.

In the preferred form of my invention, said engine cradle comprises two longitudinal members 10, preferably extending considerably further than the front pair of load-applying points B, possibly by as much as one half their length, said longitudinal members 10 being secured directly to the engine mounting brackets 9, and each of said members 10 being directly connected to the load-applying members B on the same side of the center plane, for example, by means of oblique struts 11. The load-applying points B on either side of the vertical axial plane of the engine are then interconnected by means of struts 12, which are preferably rectilinear, and the whole structure is braced by means of oblique struts such as 13 and 14.

The cantilever frame and the engine cradle may be assembled in any convenient manner, as, for example, by means of articulated joints or by fusion welding. In this manner, load-supporting members A and applying members B are provided, which are opposite one another and between which may be inserted the elastic interconnecting cushioning means 3.

Said elastic cushioning members may be of any type or shape. However, I prefer to utilize for this purpose devices which are already known in the art, which allow relative motion of the interconnected parts only along their center line, and I so design the structures that said centerline is substantially perpendicular to the axis of the aircraft propeller driven by engine 2.

Whatever may be the type of elastic connectors used, they may advantageously be combined with shock-absorbing means of any suitable type, for example, of the friction or hydraulic types, adapted to absorb and to dissipate gradually the energy of the engine vibrations, and so to impede the formation of synchronous pulsations in the structure of the aircraft.

By the above described means, I obtain an aircraft power plant in which vibration is substantially restricted to the engine proper, and in which the supporting structure has the maximum strength for a given weight of material.

I wish it to be understood, however, that I do not desire to be limited to the exact details of construction shown and described, for obvious modifications thereto will occur to a person skilled in the art.

What I claim is:

1. An engine mounting for an aircraft engine comprising a cradle of general U-shape in section for holding said engine and partially encompassing and extending longitudinally of said engine and having the free ends of its leg portions rigidly secured to the sides of said engine, a plurality of load transmitting elements mounted upon said cradle along two sides of said engine, a rigid supporting frame adapted to be joined to the fuselage of said aircraft and extending adjacent the bight of said U-shaped cradle, a plurality of load supporting elements on said frame adjacent said load transmitting elements, and elastic means for fastening each load transmitting element to its corresponding load supporting element.

2. A mounting as in claim 1, said frame comprising rigid bracing members forming a quadrangle, and further bracing members connected to said first mentioned bracing members and forming a triangular bracing system within said quadrangle.

3. A mounting as in claim 1, said cradle comprising a plurality of struts forming two triangular prisms, a strut forming a lateral edge of each of said prisms being rigidly secured to said engine, a quadrangular cradle base structure, said base structure having said load transmitting elements secured thereto, some of said strut members forming at least a part of the sides of said base structure.

4. A mounting as in claim 1, said cradle comprising a plurality of struts forming two triangular prisms, a strut forming a lateral edge of each of said prisms being rigidly secured to said engine, a quadrangular cradle base structure, said base structure having said load transmitting secured thereto, some of said strut members forming at least a part of the sides of said base structure, a plurality of second struts forming the sides of a pair of tetrahedrons each having a base substantially coinciding with a base of each of said prisms, and each having an edge which is substantially a continuation of each strut forming a lateral edge of each of said prisms.

MARC BIRKIGT.